(12) United States Patent
Innes (10) Patent No.: US 9,709,274 B2
(45) Date of Patent: Jul. 18, 2017

(54) AUXETIC STRUCTURE WITH STRESS-RELIEF FEATURES

(71) Applicant: Rolls-Royce plc, London (GB)

(72) Inventor: Matthew Christopher Innes, North Lancaster (CA)

(73) Assignee: ROLLS-ROYCE PLC, London (GB)

( * ) Notice: Subject to any disclaimer, the term of this patent is extended or adjusted under 35 U.S.C. 154(b) by 915 days.

(21) Appl. No.: 14/050,277

(22) Filed: Oct. 9, 2013

(65) Prior Publication Data

US 2014/0260281 A1  Sep. 18, 2014

Related U.S. Application Data (60) Provisional application No. 61/798,965, filed on Mar. 15, 2013.

(51) Int. Cl.
| | |
|---|---|
| F23R 3/00 | (2006.01) |
| F23R 3/06 | (2006.01) |
| F23M 5/00 | (2006.01) |
| B23K 35/22 | (2006.01) |

(52) U.S. Cl.
CPC ............ *F23R 3/002* (2013.01); *B23K 35/228* (2013.01); *F23M 5/00* (2013.01); *F23R 3/06* (2013.01); *F23M 2900/05002* (2013.01); *F23M 2900/05004* (2013.01); *F23R 2900/00005* (2013.01); *F23R 2900/00018* (2013.01); *Y10T 83/0572* (2015.04); *Y10T 428/24314* (2015.01)

(58) Field of Classification Search
CPC .. F23R 3/002; F23R 3/04; F23R 2900/00005; B26D 3/12; F02M 59/445; F02G 2258/00; F23M 2900/05002; F23M 2900/05004; F02C 7/20; Y10T 428/24314

USPC ................................................ 428/136; 83/39
See application file for complete search history.

(56) References Cited

U.S. PATENT DOCUMENTS

| | | | |
|---|---|---|---|
| 3,301,356 A | 1/1967 | Pompa | |
| 3,655,501 A * | 4/1972 | Tesch ..................... | A47G 27/00 15/104.002 |
| 4,004,056 A | 1/1977 | Carroll | |
| 4,168,348 A | 9/1979 | Bhangu et al. | |
| 4,269,032 A | 5/1981 | Meginnis et al. | |
| 4,302,940 A * | 12/1981 | Meginnis ................ | F23R 3/002 416/231 A |
| 4,574,676 A | 3/1986 | Jansen-Herfeld | |
| 4,776,172 A * | 10/1988 | Havercroft ............. | F23R 3/002 416/97 A |
| 4,794,835 A | 1/1989 | Fujiyoshi | |
| 5,352,540 A * | 10/1994 | Schienle ................ | B32B 18/00 415/170.1 |

(Continued)

FOREIGN PATENT DOCUMENTS

| | | |
|---|---|---|
| GB | 2319201 A | 5/1998 |

OTHER PUBLICATIONS

International Search Report PCT/US2013/067739 mailed on Aug. 18, 2014.

*Primary Examiner* — Gerald L Sung
*Assistant Examiner* — Alain Chau
(74) *Attorney, Agent, or Firm* — Oliff PLC (57) ABSTRACT

A material which exhibits auxetic characteristics and control of thermal expansion characteristics while experiencing significant stress reduction is disclosed. The material has a repeating pattern of void structures along both lateral symmetry lines and longitudinal symmetry lines.

18 Claims, 6 Drawing Sheets

(56) References Cited

U.S. PATENT DOCUMENTS

| | | | |
|---|---|---|---|
| 5,370,499 A | 12/1994 | Lee | |
| 5,560,198 A | 10/1996 | Brewer et al. | |
| 5,850,895 A * | 12/1998 | Evrard | F16D 65/12 188/218 XL |
| 6,681,577 B2 | 1/2004 | Bolender et al. | |
| 7,052,233 B2 | 5/2006 | Fried et al. | |
| 7,373,778 B2 | 5/2008 | Bunker et al. | |
| 7,594,401 B1 * | 9/2009 | Chen | F01D 9/023 60/752 |
| 7,631,502 B2 | 12/2009 | Burd et al. | |
| 8,347,632 B2 | 1/2013 | Hoffmann | |
| 2004/0206152 A1 | 10/2004 | Durney et al. | |
| 2007/0122590 A1 * | 5/2007 | Lalvani | B32B 3/266 428/136 |
| 2007/0193248 A1 * | 8/2007 | Bessagnet | F23R 3/06 60/39.01 |
| 2009/0113894 A1 | 5/2009 | Mayer et al. | |
| 2009/0193813 A1 * | 8/2009 | Garry | F23M 5/04 60/796 |
| 2011/0023496 A1 * | 2/2011 | Bastnagel | F23R 3/002 60/752 |
| 2011/0059291 A1 * | 3/2011 | Boyce | C08J 5/00 428/136 |
| 2011/0081235 A1 * | 4/2011 | Shah | F01D 5/16 415/170.1 |
| 2011/0206519 A1 | 8/2011 | Heinemann et al. | |

* cited by examiner

FIG. 11

AUXETIC STRUCTURE WITH STRESS-RELIEF FEATURES

CROSS-REFERENCE TO RELATED APPLICATIONS

This application claims priority to U.S. Provisional Patent Application No. 61/798,965, filed Mar. 15, 2013, the contents of which are hereby incorporated in their entirety.

FIELD OF TECHNOLOGY

Gas turbine combustors, turbine liners, and other components are subjected to thermal expansion and experience significant stress. An improved material for use in components that benefit from control of thermal expansion characteristics and that experiences significant stress reduction is disclosed.

BACKGROUND

Gas turbine engines operate at temperatures that are disruptive to the natural characteristics of metal and other engineering materials such as ceramics and composites. Such conditions cause material to fatigue, stress and fail. It is desired to provide stress-relief features by providing slots and various other geometric configurations in the surface of a material, such as a material for use in a turbine liner, and as they appear in auxetic structures.

While virtually all materials undergo a transverse contraction when stretched in one direction and a transverse expansion when compressed, auxetic materials do not. The magnitude of the transverse deformation exhibited by materials upon compression or stretching is expressed by a quantity known as Poisson's ratio. In ordinary materials that contract laterally when stretched and expand laterally when compressed, Poisson's ratio is defined as a positive number. However, some materials, when stretched, become thicker in the direction perpendicular to which they are being stretched. Such materials have a negative Poisson's ratio, and are referred to as auxetic materials.

The structure of a material may be altered in such a way that the material exhibits auxetic behavior. One way in which this may be done is by disposing an exemplary pattern of elliptical holes within and extending through the plane of the material. However, materials that are modified to exhibit auxetic behavior in this manner may exhibit stress concentrations at the edges of the minor radii of the holes. The stress concentrations may lead to cracking and, in severe cases, component failure. A need exists for a material that exhibits auxetic properties, and that will not be subject to stress concentrations and cracking.

BRIEF DESCRIPTION OF THE DRAWINGS

While the claims are not limited to a specific illustration, an appreciation of the various aspects is best gained through a discussion of various examples thereof. Referring now to the drawings, exemplary illustrations are shown in detail. Although the drawings represent the illustrations, the drawings are not necessarily to scale and certain features may be exaggerated to better illustrate and explain an innovative aspect of an example. Further, the exemplary illustrations described herein are not intended to be exhaustive or otherwise limiting or restricted to the precise form and configuration shown in the drawings and disclosed in the following detailed description. Exemplary illustrations are described in detail by referring to the drawings as follows:

DETAILED DESCRIPTION

This present improvement provides enhanced material structure stress relief. A sheet of metal or other material such as a ceramic or a composite containing a pattern of elliptical holes or slots will exhibit auxetic behavior when loaded in the plane of the sheet, but will also exhibit stress concentrations at the minor radii. In a highly loaded component, this may lead to cracking and component failure.

A combustor liner with sheet metal walls could employ round effusion cooling holes. Several new hole configurations are proposed to reduce the stress concentration. The exemplary embodiments herein replace the conventional round effusion cooling holes with a pattern of slots forming an auxetic structure which can be referred to as an auxetic metamaterial.

Figure 1:
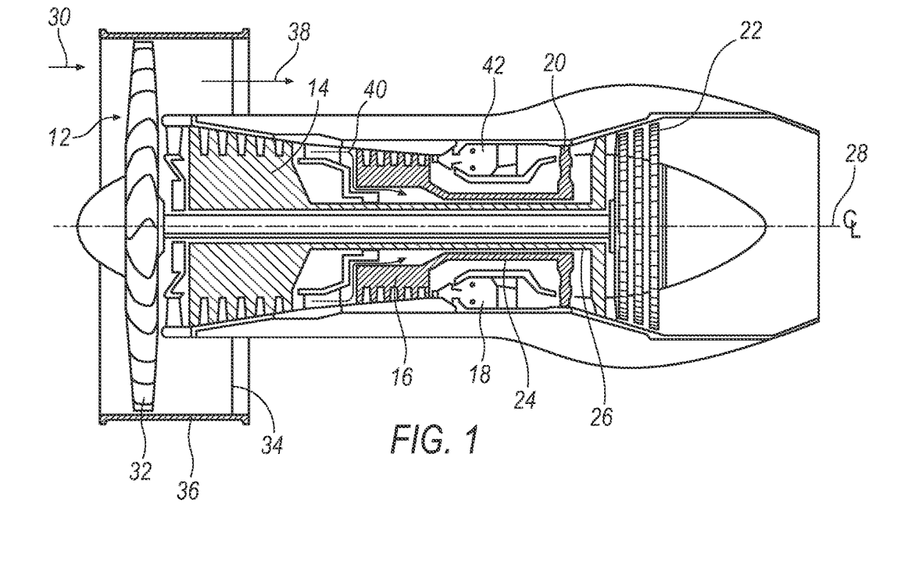
FIG. 1 illustrates a schematic view of a gas turbine.

FIG. 1 illustrates a gas turbine engine 10, which includes a fan 12, a low pressure compressor and a high pressure compressor, 14 and 16, a combustor 18, and a high pressure turbine and low pressure turbine, 20 and 22, respectively. The high pressure compressor 16 is connected to a first rotor shaft 24 while the low pressure compressor 14 is connected to a second rotor shaft 26. The shafts extend axially and are parallel to a longitudinal center line axis 28.

Ambient air 30 enters the fan 12 and is directed across a fan rotor 32 in an annular duct 34, which in part is circumscribed by fan case 36. The bypass airflow 38 provides engine thrust while the primary gas stream 40 is directed to the combustor 18 and the high pressure turbine 20. The gas turbine engine 10 includes an improved combustor 18 having a shell 42 made of improved material. It will be appreciated that the improved material could be used in other machinery and is not therefor limited to gas turbine engine environments.

Figure 2:
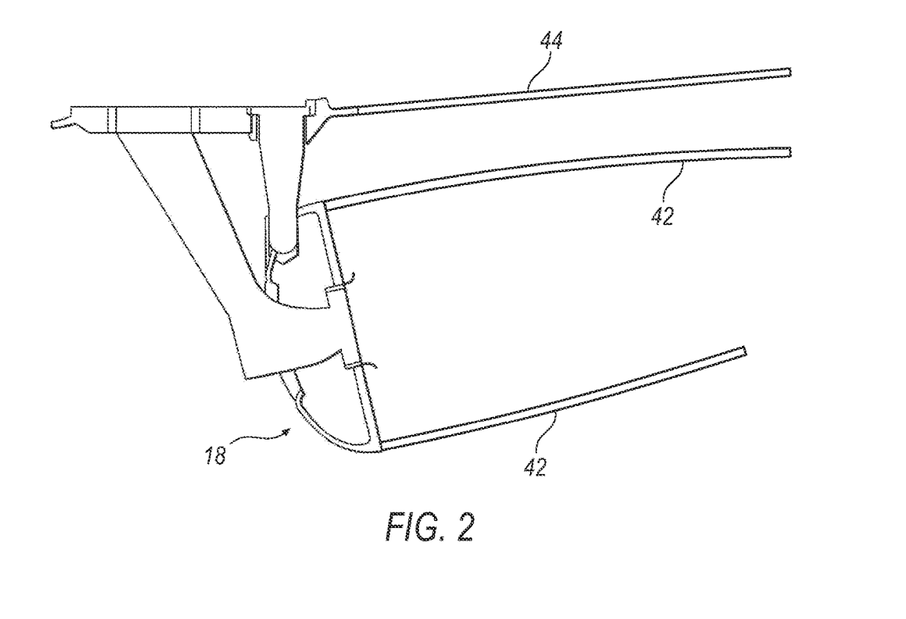
FIG. 2 illustrates a combustor for a gas turbine engine with a shell of the improved material.

FIG. 2 illustrates one example of the improved material being used in a combustor 18 of a gas turbine engine 10. The combustor 18 has an outer liner 44 and an inner liner 46 made of metal. The inner liner 46 is made of the improved material 48. The improved material 48 may exhibit auxetic properties, and may also be more resistant to stress concentrations and failure.

Figure 3:
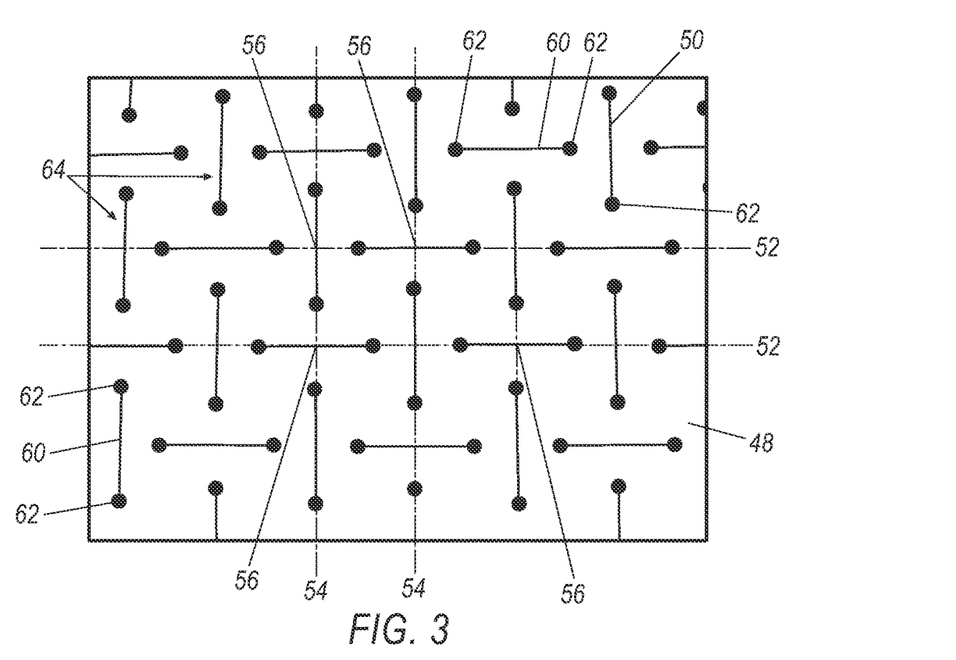
FIG. 3 illustrates a material having a configuration of void structures that allows the material to exhibit auxetic properties with stress relief holes, where the void structures are barbell shaped.

FIG. 3 illustrates an exemplary configuration for void structures 50 in the improved material 48, that includes patterns that consist of horizontal and vertical void structures 50 arranged on horizontal and vertical symmetry lines 52, 54 in a way that the symmetry lines 52, 54 are equally spaced in both dimensions. The centers of the void structures 50 are on the crossing point 56 of the symmetry lines. Vertical and horizontal void structures 50 alternate on the vertical and horizontal symmetry lines 52, 54. Any vertical void structures 50 are surrounded by horizontal void structures 50 along the horizontal symmetry lines 54, and any horizontal void structures 50 are surrounded by vertical void structures 50 along the vertical symmetry lines 52. The shapes of void structures 50 may include but are not limited to, S-shaped, hook-shaped, J-shaped, and barbell-shaped.

The slot configurations illustrated and described herein, when used as the building blocks of an auxetic structure, exhibit less stress at the tips of the slots than would be present in elliptical holes or narrow oblong slots. This allows either longer life with the same porosity or reduced porosity with the same life, as compared to an auxetic component with elliptical or oblong slots.

The improved material 48 could be comprised of a sheet of material that had void structures 50 disposed therein while the sheet was in its relaxed state. The void structures 50 that are shown in the surface of material 48, may be formed via laser cutting, stamping, water jet cutting, electron beam cutting, or another manufacturing process. This process could also be used in other materials, such as rubber, foam, metal, or some other material for other applications, where auxetic properties and resistance to stress concentrations are desired.

Figure 4:
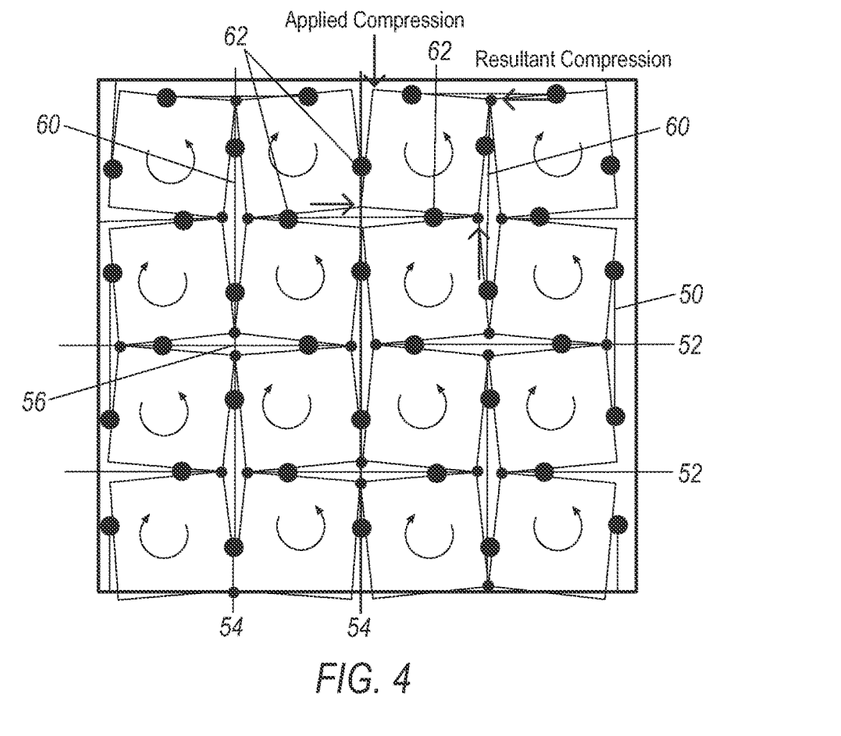
FIG. 4 illustrates a material having the configuration of void structures of FIG. 3, showing the forces acting on the material when compression is applied.

FIGS. 3 and 4 illustrate one example of a configuration for void structures 50 in an improved material 48 in which the shape of the void structures 50 may lead to reduced stresses in the material 48. Further, the configuration of the void structures 50 enables the improved material 48 to exhibit auxetic properties. As shown in FIG. 3, void structures 50 extend both laterally in rows and longitudinally in columns in the material 48 in a repeating pattern, with the rows and columns generally perpendicular to one another.

Each of the void structures 50 shown in FIGS. 3 and 4 has a slot portion 60 and two holes 62. Each of the holes 62 is disposed on an opposite end of the slot portion 60 of the void structure 50, and serves to reduce stress concentrations at the ends of void structures 50. FIG. 4 shows the stresses on the material 48 of FIG. 3 when compression is applied to one side of the material, and how the "traditional barbell" shaped configuration 64 of the void structures 50 in a material results in auxetic behavior.

The "traditional barbell" configuration 64 shown in FIGS. 3 and 4 minimizes the propagation of cracks by disposing a hole at both ends of the slot portion 60 to relieve the stress concentration found there. Furthermore, the configuration of void structures 50 shown in FIGS. 3 and 4 removes less material than is removed when using conventional elliptical slots. This results in a material structure which is less likely to crack and is less porous. Reduced porosity is desirable for applications such as a combustor liner that requires a controlled level of porosity to control the flow of air through the combustor liner wall. Reduced porosity is also desirable in other gas turbine applications such as turbine seal segments or blade tracks, or any component whose functions include maintaining a pressure differential or metering air flow.

The configurations for "barbell" void structures 50 shown in FIGS. 5A to 5D depict variations for void structures in which the void structures are formed with slot portions connecting pairs of round or oblong holes, rather than the elliptical or oblong slots typically used in the manufacture of materials that exhibit auxetic characteristics. The slot portion may be straight or curved. The length and width of the slot portion, the diameter of the holes, the shape of the holes (i.e. round, oblong, elliptical, other variations) and the spacing between slots can be varied to achieve the desired combination of auxetic behavior, stress reduction, and porosity. One embodiment presents a slot 60 having a width and holes 62 having a diameter. The diameter is several times great than the width.

Figures 5A, 5B, 5C:
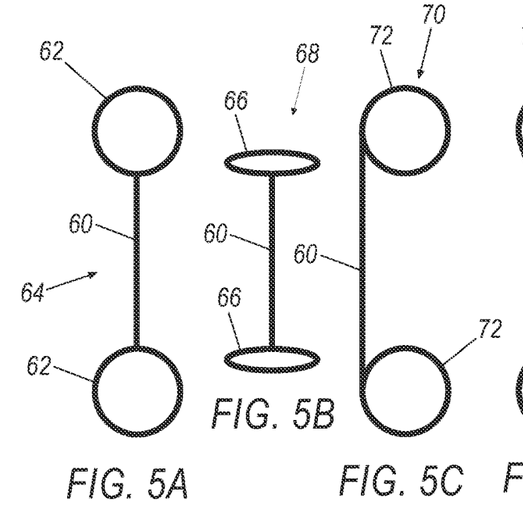
FIG. 5A illustrates the shape of the void structures in FIG. 3, in which the void structures are shaped as a traditional barbell.
FIG. 5B illustrates an alternative shape for the void structure of FIG. 3, in which the void structures are shaped as a compressed barbell.
FIG. 5C illustrates another alternative shape for the void structures of FIG. 3, in which the void structures are shaped as a pince-nez.

FIG. 5A shows the traditional barbell configuration shown in FIGS. 3 and 4. FIG. 5B shows a compressed barbell 68 configuration. The compressed barbell 68 is similar to the traditional barbell configuration 64 shown in FIG. 5A, but with oblong holes 66 rather than round holes 62.

Figure 5D:
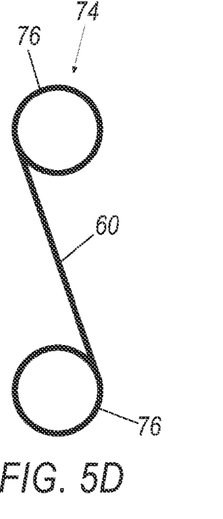
FIG. 5D illustrates another alternative shape for the void structures of FIG. 3, in which the void structures are shaped as a reverse pince-nez.

FIG. 5C illustrates a pince-nez 70 variation on the barbell configuration. In the pince-nez configuration 70, the holes 72 are both disposed on the same side of the slot portion 60. FIG. 5D illustrates a reverse pince-nez 74 configuration for a void structure 50 in which the holes 76 are each disposed on an opposite side of the slot portion 60. It will be appreciated that holes 72, 76 of both the pince-nez 70 and the reverse pince-nez 74 configurations may be either round holes, as shown in the barbell configuration 64, or oblong holes, as shown in the compressed barbell configuration 68. The void structures 50 illustrated in FIGS. 5A through 5D may all be used in similar applications. The inside portion of the holes 72 may have all of their material removed.

An alternative to the barbell void structure configurations is a slot with hooks at each end, as shown in FIGS. 6A through 6E. The "double hook" void structures 50 illustrated in FIGS. 6A through 6E have the same advantages over traditional auxetic materials as the variations shown in FIGS. 3 through 5D, in that more material is retained, they have lower stress concentrations, and they exhibit auxetic behavior. However, there are several advantages to using the double hook void structures rather than the barbell void structure configurations.

Conceptually, the double hook void structure may be an improvement over the barbell configurations 64, 68, 70, and 74. The hook-shaped configuration distributes the stress across a larger area in the same way as the barbell configurations shown and described in FIGS. 5A through 5D, but without removing material from the interior of the holes. As with the barbell and related configurations 64, 68, 70, 74, several parameters may be varied to achieve the desired properties. These include the length, width and angular orientation of the straight section 78, the shape of the hooks, and the spacing between slots. The double hook configurations exhibit lower porosity than the barbell configurations, which is advantageous when the material is used for a combustor liner, seal arm, or other component where control of air leakage is required.

Figures 6A, 6B, 6C:
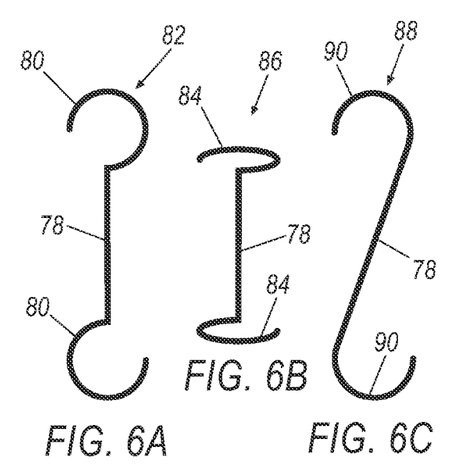
FIG. 6A illustrates another alternative shape for the void structure of FIG. 3, in which the void structures are shaped as a question mark.
FIG. 6B illustrates another alternative shape for the void structures of FIG. 3, in which the void structures are shaped as a compressed question mark.
FIG. 6C illustrates another alternative shape for the void structures of FIG. 3, in which the void structures are hook-shaped.
Figure 6D:
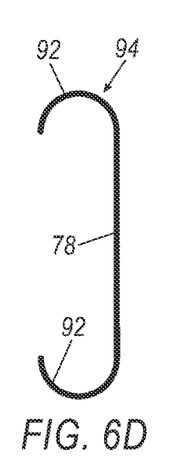
FIG. 6D illustrates another alternative shape for the void structures of FIG. 3, in which the void structures are reverse hook-shaped.
Figure 6E:
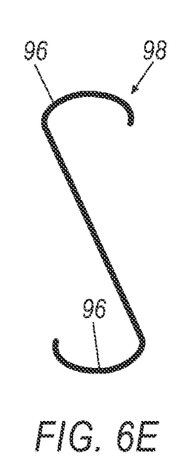
FIG. 6E illustrates another alternative shape for the void structures of FIG. 3, in which the void structures are J-hook shaped.

A variety of double hook configurations for void structures 50 are shown in FIGS. 6A through 6E. The hooks 80 in the "question mark" configuration 82 shown in FIG. 6A are configured as portions of a circle. The hooks 84 in the "compressed question mark" configuration 86 shown in FIG. 6B are configured as elongated circle portions. FIG. 6C shows a "hook" configuration 88 in which rounded hooks 90 each extend from an opposite side of the slot portion 78, while the rounded hooks 92 of the "reverse hook" configuration 94, shown in FIG. 6D, each extend from the same side of slot portion 78. The hooks 96 of the "J-hook" configuration 98, shown in FIG. 6E, are flatter than the hooks 90, 92 in the "hook" 88 and the "reverse hook" 94 configurations. It will be understood that the configurations for the void structures 50 shown and described are only a few of the possible variations that are encompassed within this disclosure.

Figure 7:
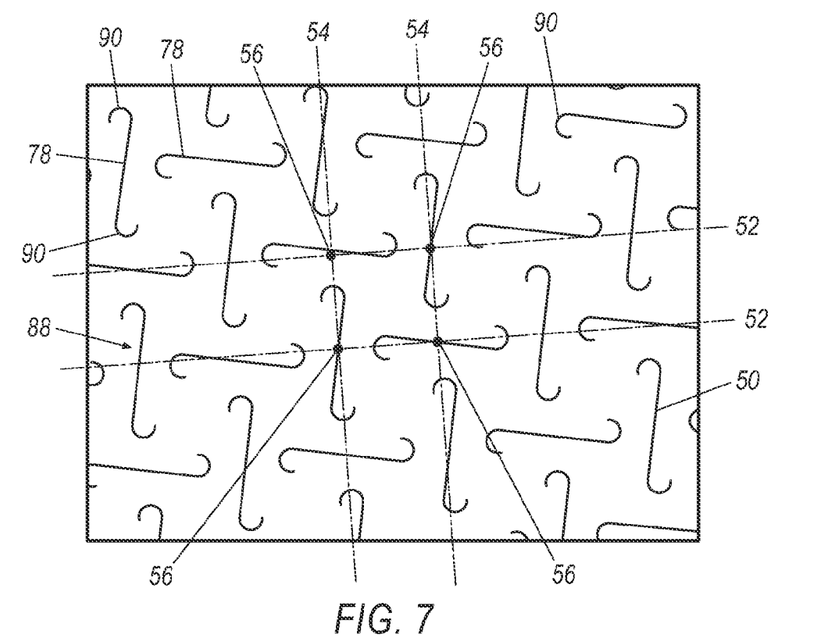
FIG. 7 illustrates a material having void structures in a hook-shaped configuration, as shown in FIG. 3, that allows the material to exhibit auxetic properties with areas of minimal stress.

FIG. 7 illustrates an example of a material having void structures 50 in the "hook" configuration 88 shown in FIG. 6C. The void structures in FIGS. 6A through 6E remove less material from the base material than is removed when preparing conventional auxetic materials, and also less material than the barbell void structures shown in FIGS. 5A through 5D. The rounded hooks 80, 84, 90, 92, and 98 at the ends of the slot portions 78 of the void structures 50 retain the advantage of lower stress concentrations at the ends of the slot portions 78 than exhibited in conventional auxetic materials.

Figure 8:
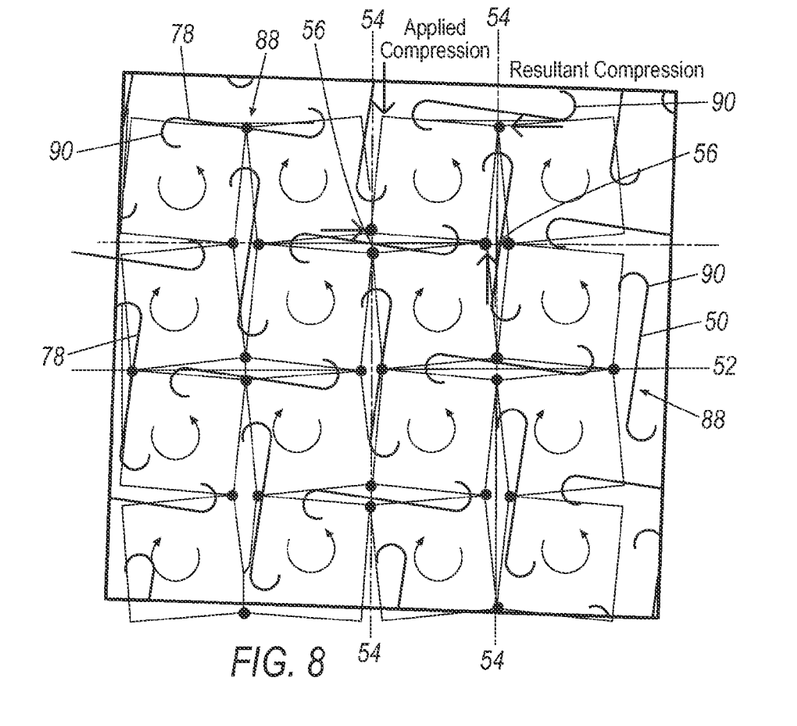
FIG. 8 illustrates a material having the configuration of hook-shaped void structures shown in FIG. 7, showing the forces acting on the material when compression is applied.

FIG. 8 illustrates a material having the auxetic structure shown in FIG. 7, showing forces within material 48 when the material is compressed on one side. As a compressive force is applied, the material 48 contracts in the direction in which the force is applied, and also in a direction perpendicular to the direction of the compressive force. Similarly, when tension is applied, the material 48 expands in the direction in which the force is applied, and also in a direction perpendicular to the direction of the tensile force.

Figure 9:
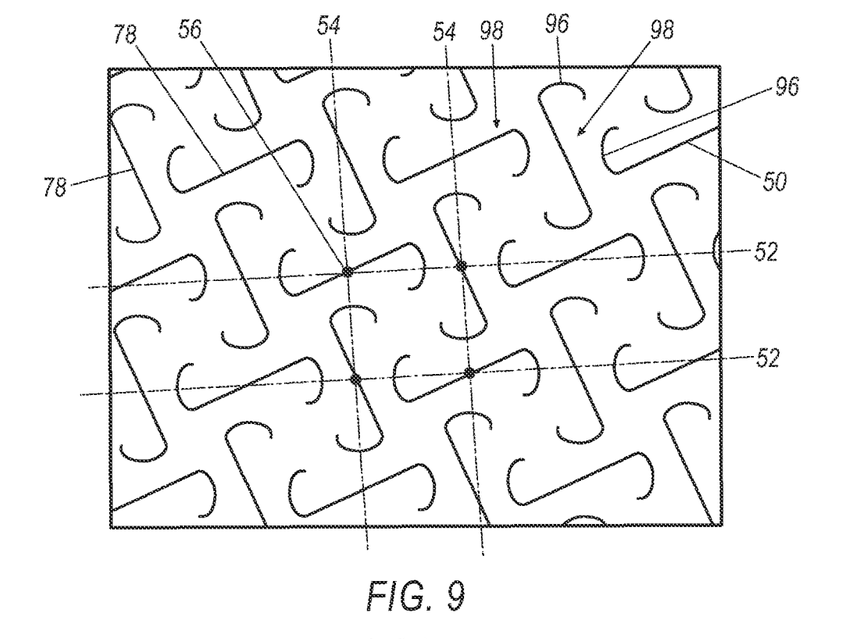
FIG. 9 illustrates a material having J-shaped void structures.
Figure 10:
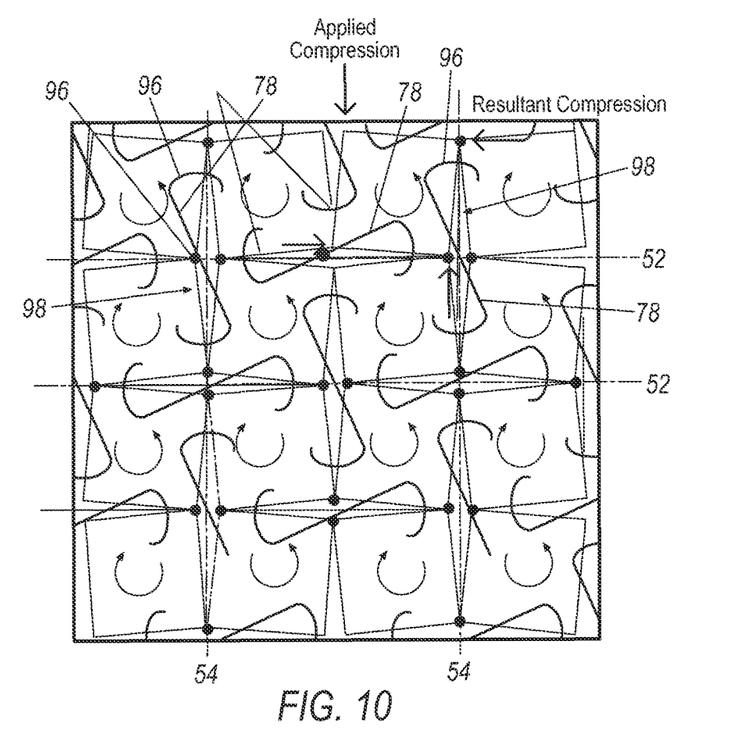
FIG. 10 illustrates a material having the J-shaped void structures shown in FIG. 9, and showing the forces acting on the material when compression is applied.

FIG. 9 illustrates a material having auxetic properties with void structures 50 in a J-hook configuration 98. The J-hooks extend in a repeating pattern along a longitudinal axis and along lateral axes, and the longitudinal axes cross the lateral axes in a generally orthogonal direction. FIG. 10 illustrates the auxetic structure shown in FIG. 9, showing forces within the material when the material is compressed on one side. Similar to the material shown in FIG. 8, the material 48 compresses in the direction in which a compressive force is applied, and also compresses in a direction perpendicular to the direction of the compressive force.

Figure 11:
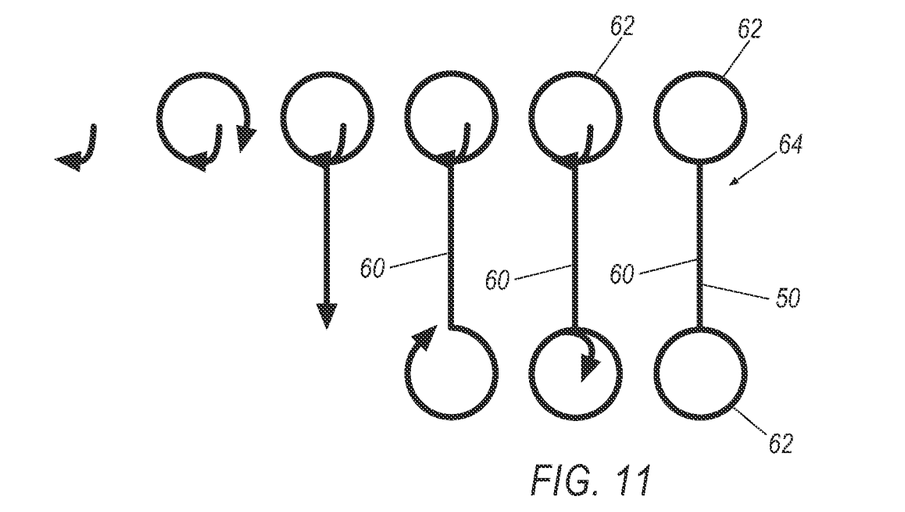
FIG. 11 illustrates a laser cutting path for manufacturing the barbell slot profile.

Both the barbell and the double-hook configurations can be manufactured by laser cutting in a single operation, although other conventional means of cutting the material may be used. Laser cutting eliminates the possibility of misalignment when performing multiple operations which could, in turn, lead to the creation of stress risers. One proposed tool path for cutting the barbell-shaped slot is shown in FIG. 11. Six separate steps are shown in this proposed tool path. The initial cut may be made within what will become the center of one of the circles at an end of the "barbell." Since there may be some cracking and imperfections associated with the initial cut of a laser, it may be beneficial to make the initial cut in an area that will not be associated with high stress levels. In this case, the initial cut is made in an area that will become waste material and will be discarded. Once the initial cut is made, the cutting continues to complete the first circle on the first end of the barbell. Then the slot portion is cut, and the second circle is cut, again completing the cutting in a waste area. Once the cutting is complete, the material in the interior of the circles is removed and discarded.

It will be appreciated that the aforementioned method and devices may be modified to have some components and steps removed, or may have additional components and steps added, all of which are deemed to be within the spirit of the present disclosure. Even though the present disclosure has been described in detail with reference to specific embodiments, it will be appreciated that the various modifications and changes can be made to these embodiments without departing from the scope of the present disclosure as set forth in the claims. The specification and the drawings are to be regarded as an illustrative thought instead of merely restrictive thought.

What is claimed is:

1. A combustor liner comprising at least one wall that comprises a material exhibiting auxetic behavior and reduced stress, the material comprising:
   a pattern of non-intersecting void structures in the material, each void structure including a slot with two ends and a stress reducing portion at each of the two ends and each void structure being symmetrically arranged along an imaginary longitudinal or lateral line, so that the void structures of the pattern are arranged along a plurality of imaginary longitudinal and lateral lines that form a grid, wherein:
   the longitudinal lines are generally perpendicular to the lateral lines;
   an individual void structure arranged along an imaginary longitudinal line is flanked by multiple void structures arranged along lateral lines;
   an individual void structure arranged along an imaginary lateral line is flanked by multiple void structures arranged along longitudinal lines; and
   the stress reducing portions of the void structures are shaped to reduce stress concentrations at the ends of the slots and configured to deform under a load applied along the longitudinal lines or the lateral lines in a manner that results in the material exhibiting the auxetic behavior.

2. The combustor liner of claim 1, wherein the void structures have a shape selected from the group consisting of barbell, compressed barbell, pince-nez, reverse pince-nez, question mark, compressed question mark, hook, reverse hook, and J-hook.

3. The combustor liner of claim 1, wherein the material is made of a sheet metal or ceramic matrix composite.

4. The combustor liner of claim 1, wherein the void structures are disposed on the material when the material is in a stress free state.

5. The combustor liner of claim 1, wherein the slot is curved or straight.

6. The combustor liner of claim 1, wherein each stress reducing portion is a hole or a curve.

7. The combustor liner of claim 1, wherein the void structures are in a double-hook configuration in which each stress reducing portion is a hook at each end of the slot.

8. The combustor liner of claim 1, wherein the material is formed by at least one of laser cutting, stamping, water jet cutting, and electron beam cutting.

9. A gas turbine engine comprising the combustor liner of claim 1.

10. A combustor liner comprising at least one wall that comprises a material exhibiting auxetic behavior and reduced stress, the material comprising:
a grid pattern of non-intersecting void structures that form openings in the material, each void structure including a slot with two ends and a stress reducing portion at each of the two ends, wherein:
the grid pattern of non-intersecting void structures comprises a first plurality of the void structures with slots that are generally perpendicular to slots of a second plurality of the void structures; and
the stress reducing portions of the void structures are shaped to reduce stress concentrations at the ends of the slots and configured to deform when a load is applied in a manner that results in the material exhibiting the auxetic behavior.

11. The combustor liner of claim 10, wherein the void structures have a shape selected from the group consisting of barbell, compressed barbell, pince-nez, reverse pince-nez, question mark, compressed question mark, hook, reverse hook, and J-hook.

12. The combustor liner of claim 10, wherein the material is made of a sheet metal or ceramic matrix composite.

13. A gas turbine engine comprising the combustor liner of claim 10.

14. The combustor liner of claim 10, wherein the void structures are disposed on the material when the material is in a stress free state.

15. The combustor liner of claim 10, wherein the slot is curved or straight.

16. The combustor liner of claim 10, wherein each stress reducing portion is a hole or a curve.

17. The combustor liner of claim 10, wherein the void structures are in a double-hook configuration in which each stress reducing portion is a hook at each end of the slot.

18. The combustor liner of claim 10, wherein the material is formed by at least one of laser cutting, stamping, water jet cutting, and electron beam cutting.

* * * * *